United States Patent [19]

Walla

[11] 4,304,969
[45] Dec. 8, 1981

[54] POWER CIRCUIT FOR LOUDSPEAKER TELEPHONE

[75] Inventor: Klaus Walla, Gauting, Fed. Rep. of Germany

[73] Assignee: Siemens Aktiengesellschaft, Berlin & Munich, Fed. Rep. of Germany

[21] Appl. No.: 73,567

[22] Filed: Sep. 7, 1979

[30] Foreign Application Priority Data

Sep. 15, 1978 [DE] Fed. Rep. of Germany ....... 2840250

[51] Int. Cl.³ .............................................. H04M 1/60
[52] U.S. Cl. ..................................... 179/81 B; 179/77
[58] Field of Search ..................... 179/77, 81 R, 81 A, 179/81 B, 70, 1 HF, 16 F

[56] References Cited

FOREIGN PATENT DOCUMENTS 2831409 8/1979 Fed. Rep. of Germany .... 179/81 B

*Primary Examiner*—Bernard Konick
*Assistant Examiner*—J. A. Popek
*Attorney, Agent, or Firm*—Hill, Van Santen, Steadman, Chiara & Simpson

[57] ABSTRACT

A power circuit for a loudspeaker telephone station incorporates separate capacitors across the power terminals of the transmitting and receiving amplifiers, with a regulating circuit for charging the capacitor connected across the receiving amplifier only after the other capacitor has been fully charged. A control circuit for the telephone station is connected in parallel with the transmitting amplifier.

6 Claims, 1 Drawing Figure

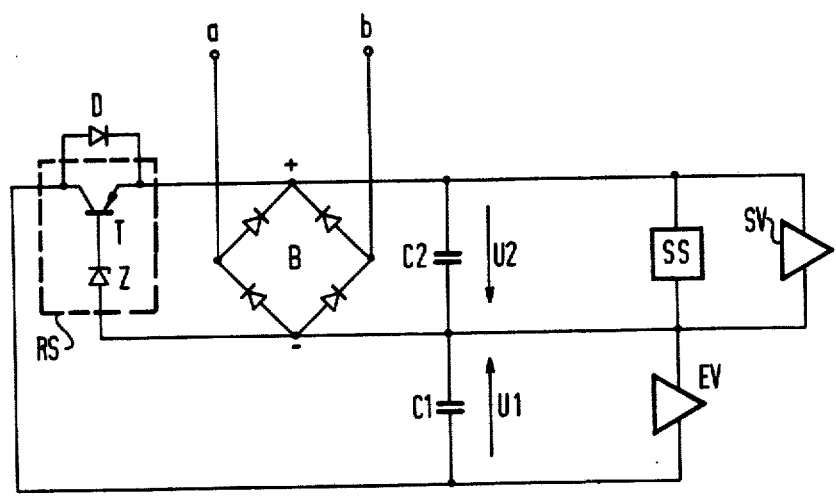

POWER CIRCUIT FOR LOUDSPEAKER TELEPHONE

FIELD OF THE INVENTION

The present invention relates to a power circuit for a loudspeaker telephone station, and more particularly to such a station having amplifier apparatus for two-way transmission.

THE PRIOR ART

Loudspeaker telephone stations are those which have loudspeakers for amplifying a received communication, and typically such stations also include amplifiers for the transmitter and the receiver. Particularly when long lines connect the receiver from a remote transmitting station, only relatively small current is available, and the receiver amplifier represents a load which has a relatively large current output, which fluctuates strongly. When a capacitor is used to stabilize the voltage for the receiving amplifier, a relatively large capacitor must be provided, and charging the capacitor over high impedance connection lines can take several seconds. In contrast to the receiving amplifier, the transmitting amplifier requires only a relatively small current, but may not function satisfactorily during the time period in which the capacitor required for the receiving amplifier is charging. Also, the control circuit for the loudspeaker telephone station can also function insufficiently during the charging of the capacitor.

While extensive switching measures may be employed to overcome this disadvantage, it is desirable to provide a simple and effective measure for dealing with the problem.

BRIEF SUMMARY OF THE INVENTION

It is a principal object of the present invention to provide a circuit arrangement which enables the transmitting amplifier and the control circuit to be fully active as quickly as possible. In accordance with one embodiment of the present invention, there is provided a first capacitor connected in parallel to the receiver amplifier and a second capacitor is provided parallel to the remainder of the circuit, the second capacitor being smaller than the first capacitor, and a regulating circuit is provided which begins the charging of the first capacitor after the second capacitor is fully charged.

By use of the present invention, the transmitting amplifier and the control circuit are active very quickly, while the receiving amplifier is made active later, after the first capacitor is charged.

In a preferred embodiment of the present invention, the second capacitor is connected between the outputs of a bridge rectifier, and parallel to the control circuit and to the transmitting amplifier, and a series circuit, including the first capacitor and a switching transistor, is arranged between the outputs of the bridge rectifier and connected in parallel with the receiver amplifier. A Zener diode is connected with the base of the switching transistor. The circuit arrangement is simple and readily susceptible to integrated circuit construction, since the regulating circuit which controls the charging processes of the two capacitors consists of only two elements, namely, a Zener diode and a switching transistor.

BRIEF DESCRIPTION OF THE DRAWING

Reference will now be made to the accompanying drawing which shows a schematic diagram of an illustrative embodiment of the present invention.

DESCRIPTION OF THE PREFERRED EMBODIMENT

The drawing illustrates a schematic diagram of a line-fed loudspeaker telephone station incorporating an illustrative embodiment of the present invention, in which the individual modules of the speech circuit are represented in block diagram form. The receiving amplifier EV is connected in parallel with a first capacitor C1, and the transmitting amplifier SV and the control circuit SS are connected in parallel with a second capacitor C2. The control circuit SS regulates operation of the amplifiers EV and SV. A bridge rectifier B is connected to a source of AC potential at terminals a and b, and supplies DC to output terminals which are connected in parallel with the capacitor C2. A regulating circuit RS incorporates a switching transistor T and a Zener diode Z. The emitter of the transistor is connected from the positive output terminal of the bridge rectifier B and the collector of the transistor is connected to one terminal of the capacitor C1. The other terminal of the capacitor C1 is connected to the negative output terminal of the bridge rectifier B, and the base of the transistor T is connected by the Zener diode Z to the same terminal.

On operation of the circuit, the AC voltage is first supplied to the terminals a and b (by means not shown), the capacitor C2 is rapidly charged up, and the transistor T is blocked during the charging of the capacitor C2. The blocking of the transistor occurs because of the Zener diode Z in series with the base-emitter junction of the transistor.

When the capacitor C2 is fully charged, the voltage across the capacitor C2, as well as the output voltage of the bridge B, exceeds the Zener voltage of the Zener diode Z, and caues the transistor T to conduct. The capacitor C1 is then charged by the emitter-collector current of the transistor T.

Because the capacitor C2 is smaller in capacitance than the capacitor C1, its charging is much more rapid, so that the sending amplifier SV and the control circuit SS are rendered operative almost immediately, after which the receiving amplifier is rendered operative when the larger capacitor C1 is fully charged. The voltages across the capacitors C2 and C1 are represented in the drawing as to polarity by arrows U1 and U2, respectively.

The diode D is connected across the emitter and collector terminals of the transistor T, so as to allow the capacitor C1 to discharge through the diode D and through the control circuit SS. This is accomplished by the control circuit SS when the loudspeaker telephone device is turned off, by interrupting the AC current supply to the terminals a and b. The capacitor C1 is therefore in its discharge condition each time the loudspeaker telephone device is turned on, so that the operation described above occurs each time the device is turned on. The discharge of the capacitor C1 through the diode D disables the receiver amplifier EV, so that the loudspeaker does not produce sounds responsive to noises which are present during the time the loudspeaker telephone device is turned off, and during the initial period after it is turned on.

From the above, it is apparent that the present invention furnishes an economical and simple solution, making it possible to supply power to the control circuit and the transmitting amplifier almost immediately, while power is applied to the receiving amplifier subsequently. Various modifications and additions may be made in the apparatus of the present invention without departing from the essential features of novelty thereof, which are intended to be defined and secured by the appended claims.

What is claimed is:

1. A power circuit for a loudspeaker telephone having transmitting and receiving amplifiers, each of said amplifiers having a pair of terminals adapted to be connected to a source of DC operating voltage, comprising in combination; a first capacitor connected across said terminals of said transmitting amplifier, a second capacitor connected across said terminals of said receiving amplifier, said second capacitor being smaller in capacitance than said first capacitor, and a regulating circuit connected with said capacitors for first charging said first capacitor and then said second capacitor.

2. Apparatus according to claim 1, wherein said regulating circuit includes a bridge rectifier for supplying DC at a pair of output terminals, said first capacitor being connected across said output terminals, and wherein said regulating circuit includes a switching transistor having its collector and emitter terminals connected in series with said second capacitor across said output terminals, both of said capacitors being connected in common to the more negative one of said output terminals, and including a Zener diode connected between said negative output terminal and the base of said switching transistor.

3. Apparatus according to claim 2, wherein the emitter of said switching transistor is connected to the more positive one of said output terminals, and the collector of said switching transistor is connected to the more negative one of said output terminals through said first capacitor.

4. Apparatus according to claim 1, wherein said regulating circuit includes a source of DC voltage adapted to be connected across said first capacitor, and a switching transistor having its emitter and base terminals connected across said first capacitor for sensing when said first capacitor is fully charged.

5. Apparatus according to claim 4, including means for connecting the collector of said switching transistor with said second capacitor for charging said second capacitor with collector current after said first capacitor is fully charged.

6. Apparatus according to claim 5, including a diode connected across the emitter and collector terminals of said switching transistor.

* * * * *